(12) United States Patent
Larson et al.

(10) Patent No.: US 8,596,331 B2
(45) Date of Patent: Dec. 3, 2013

(54) MOUNTING SYSTEM FOR WINDOW AFFINITY DISPLAYS

(75) Inventors: Sean C. Larson, Monroe, GA (US); Shane D. Lewis, Flowery Branch, GA (US); C. Jennifer Jones, Loganville, GA (US)

(73) Assignee: Fanz, LLC, Monroe, GA (US)

( * ) Notice: Subject to any disclaimer, the term of this patent is extended or adjusted under 35 U.S.C. 154(b) by 0 days.

(21) Appl. No.: 13/200,297

(22) Filed: Sep. 22, 2011

(65) Prior Publication Data

US 2013/0075047 A1    Mar. 28, 2013

(51) Int. Cl.
*A47H 13/00*    (2006.01)

(52) U.S. Cl.
USPC ............... 160/368.1; 160/350; 160/370.21

(58) Field of Classification Search
USPC ......... 160/333, 368.1, 350, 370.21, 382, 185; 248/683; 40/597, 600
See application file for complete search history.

(56) References Cited

U.S. PATENT DOCUMENTS

| | | | | |
|---|---|---|---|---|
| 1,778,499 A * | 10/1930 | King | | 160/330 |
| 2,500,074 A * | 3/1950 | Hill | | 160/123 |
| 3,905,414 A * | 9/1975 | Guebert et al. | | 160/330 |
| 3,996,987 A * | 12/1976 | Rodriguez | | 160/19 |
| 4,213,492 A * | 7/1980 | Guebert et al. | | 160/124 |
| 4,237,958 A * | 12/1980 | Guebert et al. | | 160/330 |
| 4,399,347 A * | 8/1983 | Schmitt | | 219/203 |
| 4,790,591 A * | 12/1988 | Miller | | 160/370.21 |
| 4,802,523 A * | 2/1989 | Scholten et al. | | 160/354 |
| 4,878,258 A * | 11/1989 | Casey | | 5/420 |
| 5,074,348 A * | 12/1991 | Phillips | | 160/38 |
| 5,090,095 A * | 2/1992 | Lightfoot | | 24/306 |
| 5,191,922 A * | 3/1993 | Wade | | 160/124 |
| 5,278,556 A * | 1/1994 | Oh | | 340/988 |
| 5,517,722 A * | 5/1996 | Bender | | 16/87.2 |
| 5,553,654 A * | 9/1996 | Wu | | 160/370.21 |
| 5,570,734 A * | 11/1996 | Wu | | 160/370.21 |
| 5,597,025 A * | 1/1997 | Forkner | | 160/38 |
| 5,670,219 A * | 9/1997 | Na | | 428/8 |
| 5,680,893 A * | 10/1997 | Neer | | 160/330 |
| 5,694,998 A * | 12/1997 | Chen | | 160/370.21 |
| 6,042,912 A * | 3/2000 | Simoni | | 428/38 |
| 6,089,517 A * | 7/2000 | Johnstone | | 248/205.5 |
| 6,375,143 B1 * | 4/2002 | Burns | | 248/363 |
| 6,794,011 B2 * | 9/2004 | Allard | | 428/99 |
| 6,997,501 B2 * | 2/2006 | Conforti | | 296/97.5 |
| 7,398,816 B2 * | 7/2008 | Sala | | 160/368.1 |
| 7,841,378 B2 * | 11/2010 | Henning | | 160/327 |
| 8,312,910 B2 * | 11/2012 | Zimmer | | 160/121.1 |
| 2004/0074124 A1 * | 4/2004 | Andrys | | 40/617 |
| 2006/0081344 A1 * | 4/2006 | McKearney | | 160/368.1 |
| 2007/0144688 A1 * | 6/2007 | Grat | | 160/370.21 |
| 2007/0187047 A1 * | 8/2007 | Ingrassia | | 160/166.1 |
| 2008/0006375 A1 * | 1/2008 | Meadows | | 160/371 |
| 2008/0283205 A1 * | 11/2008 | Zimmer | | 160/330 |
| 2009/0071611 A1 * | 3/2009 | Osmond | | 160/130 |

(Continued)

*Primary Examiner* — Katherine Mitchell
*Assistant Examiner* — Johnnie A Shablack
(74) *Attorney, Agent, or Firm* — Clayton, McKay & Bailey, PC (57) ABSTRACT

The invention provides a mounting system for holding one or more affinity displays upon a window in an exceptionally stable manner. The apparatus comprises a drape that is capable of being wrapped around the edge or frame edge of a window, and the drape is also attached to a plurality of surface mounting components. The drape is further linked to the affinity display.

28 Claims, 3 Drawing Sheets

(56) References Cited

U.S. PATENT DOCUMENTS

| | | | |
|---|---|---|---|
| 2009/0272500 A1* | 11/2009 | Rodriguez | 160/119 |
| 2009/0301671 A1* | 12/2009 | Locklear | 160/370.21 |
| 2010/0032536 A1* | 2/2010 | Eagan | 248/265 |
| 2010/0051214 A1* | 3/2010 | Daly | 160/368.1 |
| 2010/0116447 A1* | 5/2010 | Thompson | 160/368.1 |
| 2010/0200180 A1* | 8/2010 | Lien | 160/370.21 |
| 2010/0224331 A1* | 9/2010 | Stoughton | 160/340 |
| 2011/0168340 A1* | 7/2011 | Squillante | 160/330 |
| 2012/0055640 A1* | 3/2012 | Wu | 160/352 |
| 2012/0297541 A1* | 11/2012 | Brown | 5/490 |

* cited by examiner

FIG. 3

MOUNTING SYSTEM FOR WINDOW AFFINITY DISPLAYS

FIELD OF THE INVENTION

The invention pertains to mounting systems for display elements on windows.

BACKGROUND

Affinity displays are popular for vehicles such as cars and trucks. For instance, bumper stickers and vanity license plates commonly display loyalty to an athletic team, race car driver, or to musical concerts or other competitive events. Items mounted on antennas have included molded plastic or rubber in the shape of cartoon characters, styrofoam™ compositions molded in the shape of a sports ball, and university or sports team pennants. Plastic mounts are commonly fitted as a saddle over the top portion of a partially open vehicle window, which is then closed; such saddles commonly have a pedestal for posting a pennant, molded figure or sports logo. Other items such as the actual or imitation horns of longhorn cattle are mounted on front bumpers to show affinity for ranching or for teams with the long horn name. Trailer hitches on the rear of vehicles are used as a pedestal to mount affinity figures or other emblems.

To date such displays have had a variety of limitations. Many externally mounted items can be stolen readily by others. An emblem on a trailer hitch must be removed when the hitch is in service for hauling. Displays associated with a back bumper or other rear-facing vehicle surface are obscured when such hauling is underway. In some states even stickers on rear windows of vehicles have been outlawed. An animal horn or other three-dimensional display that is mounted on the front of a vehicle may limit how closely the driver can reasonably approach a wall or second vehicle during parking, and are often not visible from the side of a vehicle though it is intended for public view. Items mounted on antennas increase drag and wind resistance, stressing the metal. And pennants that flap freely tend to become shredded within a few uses when a vehicle bearing them is driven at highway speeds.

Items saddled on the top edges of vehicle side window plates have had a variety of drawbacks. As currently designed they are typically inflexible and thus do not provide a close fit with the window. The combination of wind resistance and poor fit then stresses the window. Also, decorative items that protrude above the top of a vehicle result in higher turbulence and related noise during use, which can be a contributor to driver fatigue. Moreover the window often cannot be closed tightly while the item is mounted, hence in bad weather the driver and passengers are subject to ingress of wind and rain as well as additional fatiguing noise from air turbulence and mechanical vibration.

Building windows are also commonly used to mount affinity displays, for instance to show team spirit, announce events, depict an institutional affiliation, make public service announcements, proclaim another message publicly, or observe religious or secular holidays, Building windows do not usually have the vehicle issues of vibration or highway-magnitude wind speeds but they do have regular problems where taped or otherwise attached displays on the inside fall after exposure to hot sun or condensed moisture. And often external displays that are mounted on building windows have even shorter lifecycles because their attachment means are unsuited for use in any but pleasant weather. Moreover adhesives that are commonly used on walls are not favored because they harden over time and are difficult to remove even with a razor blade on glass, such as happens with masking tape, duct tape, and wall-hanging stickers.

Thus there is an ongoing need for improvements in means to mount affinity displays on windows.

SUMMARY OF THE INVENTION

The invention provides a mounting system for holding one or more affinity displays upon a window in an exceptionally stable manner. The apparatus comprises a drape that is capable of being wrapped around the edge or frame edge of a window, and the drape is also attached to a plurality of surface mounting components. The drape is further linked to the affinity display.

The invention is particularly suitable for use with the retractable windows of vehicles but is not so limited.

In certain embodiments the invention provides a mounting system for window affinity displays comprising:
  a) a plurality of surface-binding components;
  b) an attachment means on each surface-binding component;
  c) a drape that is capable of being wrapped around a window edge or a window frame edge and that is linked to the respective attachment means of each surface-binding component, whereby at least two surface-binding components are linked to respective portions of the drape at sufficient distances from each other to permit their respective attachment to the opposite major surfaces of a window when the drape is wrapped about an edge or frame edge of said window; and
  d) an affinity display that is linked to at least one of the drape and a surface-binding component.

In certain particular embodiments the invention provides a mounting system for window affinity displays comprising:
  a) a plurality of vacuum cups, each comprising a respective vacuum zone;
  b) respective attachment means for each said vacuum cup, whereby the attachment means are respectively linked to the vacuum cups at positions other than within the vacuum zone;
  c) a drape that is capable of being wrapped around a window edge or window frame edge and that is linked to the respective attachment means of each vacuum cup, whereby at least two vacuum cups are linked to the drape at sufficient distances from each other to permit their respective attachment to opposite major surfaces of a window when the drape is wrapped around said window's edge or frame edge; and
  d) an affinity display that is linked to at least one of the drape and a vacuum cup.

In certain other embodiments the invention provides a mounting system for window affinity displays comprising:
  a) a plurality of magnetically pairable components;
  b) an attachment means linked to each such component;
  c) a drape that is capable of being wrapped around a window edge or window frame edge, and that is linked to the attachment means of each magnetically pairable component, such that when the drape is wrapped around said window a first magnetically pairable component may be placed on a first major surface of the window directly opposite from a second component that is placed on the window's second major surface to enable magnetic pairing between the first and second components; and
  d) an affinity display that is linked to at least one of the drape and a magnetically pairable component.

In still other embodiments the invention provides a mounting system for window affinity displays comprising:

a) a plurality of hook and loop fabric pairs, wherein each such pair comprises a member bearing hooks and a member bearing loops, one member being designated herein as a first member and the other as its counterpart;
b) a respective attachment means linked to each member of each pair;
c) a drape that is capable of being wrapped around a window edge or a window frame edge, wherein:
   i) a first member of each of at least two hook and loop pairs is linked by a respective attachment means to the drape;
   ii) members linked to the drape are at a sufficient distance from each other on the drape that they may reside on opposite sides of a window when the drape is wrapped about the edge or frame edge of the window; and
   iii) when the drape is thusly wrapped and the first member of each hook and loop pair is mated with its counterpart, each counterpart may be linked by its respective attachment means to a major surface of the window such that each side of the window is linked to at least one counterpart; and
d) an affinity display that is linked to at least one of the drape and a member of a hook and loop fabric pair.

In further embodiments the invention provides a mounting system for window affinity displays comprising:
a) a plurality of adhesive-containing components;
b) optionally a respective attachment means that is linked to each adhesive-containing component;
c) a drape that is capable of being wrapped around a window edge or a window frame edge, wherein the plurality of adhesive-containing components is linked to the drape and at least two such components:
   i) a first member of each of at least two hook and loop pairs is linked by a respective attachment means to the drape;
   ii) members linked to the drape are at a sufficient distance from each other on the drape that they may reside on opposite sides of a window when the drape is wrapped about the edge or frame edge of the window; and
   iii) when the drape is thusly wrapped and the first member of each hook and loop pair is mated with its counterpart, each counterpart may be linked by its respective attachment means to a major surface of the window such that each side of the window is linked to at least one counterpart; and
d) an affinity display that is linked to at least one of the drape and a member of a fabric pair.

DETAILED DESCRIPTION OF THE INVENTION

The invention provides a mounting system to hold one or more affinity displays against a vehicle window in a stable fashion. Essentially a drape saddles a window edge such that the window can be closed fully or mostly when the display is in use, and in particular embodiments each side of the window has one respective end of the drape held there by means of surface-binding component such as a suction cup, magnetically pairable component, hook and loop pair (i.e., Velcro® and comparable materials), or adhesive-containing component. The drape and or a surface-binding component then provides a support for an affinity display. The following definitions are intended to clarify the descriptions and claims for the invention, as the terms are used herein.

Definitions

The term "mounting system" means a combination of components by means of which an affinity display may be held upon a window in a sustainable manner. The term "mounting system" and "window placement module" are used interchangeably herein.

The term "affinity display" means an item that is used to express interest and or enthusiasm for an institution, activity or cause, such as for a sports team, academic institution, competitive event, religious or secular holiday, professional or political association, hobby, charity, political cause, or other type of institution, activity or cause.

The term "window" means a transparent, translucent or opaque solid employed as a window in an automotive vehicle or an immobile structure. The term "windshield" means a forward-facing window of a vehicle. The term "side window" means a window at the side of a vehicle, whether the window corresponds to the front seat, a seat further back in the vehicle, cargo space, or some other positioning on the side of a vehicle. The term "rear window" means a window for which at least part of the window faces toward the rear of the vehicle. The term "sunroof" means a window on the roof of a vehicle.

The term "major surface" as used herein with respect to a window refers to one or both of its larger surfaces, such as for example the interior-facing side and the exterior-facing side of a window.

The term "edge" as used herein with respect to a window means the perimeter of a window, and is the edge around which a drape according to the invention is wrapped when the invention is in use. In some embodiments the edge is the perimeter of a flat or curved plate of solid material that is employed as a window, for instance when a window is lowered or pushed out and at least one edge of a flat or curved window plate is exposed. In other embodiments the window edge includes a frame and any interior features such as upholstery associated with the frame at a particular edge, for instance for the windshield on a convertible vehicle that has its canopy lowered and the upper and side surfaces of the windshield are protected by a frame. In certain alternative embodiments a window edge includes the metal frame of a vehicle door that comprises the window.

The term "hinged" as used herein with respect to a window refers to a window that may be opened or closed by pushing or pulling one edge of the window, such as a window edge that may be moved outward or alternatively inward, and that may be closed by the opposite action of the user. The term contemplates that a window optionally may have a latch for keeping it closed and or a handle for use in opening and closing it.

The term "retractable" as used herein with respect to a window refers to a window that may be opened by sliding the window in one direction and closed by sliding the window in another direction. In one embodiment the term refers to opening by lowering the window by mechanical cranking or electrical means, and closing by raising the window.

The term "retractable" as used herein with respect to a canopy on a car such as a convertible vehicle refers to the ability of the canopy to be removed or opened to enable open-air driving.

The term "roof" means the roof of a car.

The term "canopy" means a roof of a car that optionally may be opened such as by putting the top down on a convertible vehicle.

The term "plurality" has its common and ordinary meaning of a count of two or more.

The term "surface-binding component" means a component that is capable of being adhered to the surface of a window or capable of resisting movement away from the window surface due to attractive forces operating between two surface bound components across a window's thickness. Examples of surface bound components include vacuum cups, magnetically pairable components, paired hook and loop fabric such as Velcro® in which one member is glued to the window surface, and other adhesive-containing components such as glues, putties, tapes and other adhesive materials. The term "surface-binding component" is used to refer to such components regardless of whether they are already bound to the referenced surface or merely have not yet been but could be thus attached.

The term "vacuum cup" has its common and ordinary meaning in the art. It is used synonymously herein with the term suction cup. And it includes vacuum cups of any design that is suitable for forming a vacuum seal with another surface such as by the application of manual pressure to expel air from beneath a monolithic cup, or by application of reduced pressure from a manually or electrically powered vacuum pump.

The term "vacuum zone" means the surface of a vacuum cup that is capable of forming a vacuum seal with a window surface. The vacuum zone may be circular in shape or have any other shape that is not inconsistent with forming a vacuum. In many cases it is desirable for the vacuum zone to occupy and be defined by the great majority of the working surface of a vacuum cup, i.e., by the side facing a vehicle window, but the invention is not so limited.

The term "magnetized element" means a component having a magnetic surface. The magnetized element may comprise a magnetized ferromagnetic metal or alloy, a ceramic magnet, an electromagnet, and or an extruded sheet comprises of a polymeric binder and a paramagnetic compound. A non-limiting illustrative example of a ferromagnetic metal is iron. A non-limiting illustrative example of a ferromagnetic alloy is alnico. Non-limiting illustrative examples of paramagnetic substances are ferric oxide and gadolinium. Non-limiting illustrative examples of ceramic magnets are compositions of iron and barium oxide and compositions of iron and strontium oxide. Non-limiting illustrative examples of polymeric binders include polybutadiene rubber, polyisoprene rubber, polypropylene and cellulosic materials such as paper.

The term "magnetically pairable" means the ability of counterparts to be combined to achieve a magnetic attraction. For example the term "magnetically pairable" refers to the potential of a magnetic material to attract a metal, alloy or other substance. In preferred embodiments at least one member of a magnetic pair the metal, alloy or other substance is a magnetized material that is ferromagnetic, ferrimagnetic, or paramagnetic, in the usual meaning of those adjectives. In preferred embodiments the magnetic material is itself ferromagnetic, ferrimagnetic, or paramagnetic, and optionally may be comprised by an electromagnet. The term "magnetically pairable" as used herein contemplates among other embodiments: the attraction of one magnet to another; the attraction of a magnet to a previously unmagnetized but magnetizable material; the attraction of a plurality of previously unmagnetized but magnetizable solids at different respective points of a magnet; and the attraction of a plurality of magnets at different respective points of a previously unmagnetized but magnetizable solid.

The term "working surface" as used herein with respect to a magnetically pairable component refers to a surface that can be placed upon or in close proximity to a solid window to achieve magnetic attraction between the component and a counterpart magnetically pairable working surface on the opposite side of the solid window, or that permits magnetic pairing with the window material in the event that the solid window material itself is capable of that. A working surface need not be magnetic or magnetically pairable itself if the working surface is sufficiently thin or the magnetic field is sufficiently strong that magnetic pairing is achievable as desired.

The term "hook and loop pair" or "hook and loop fabric pair" means Velcro® and comparable materials in which a fabric having a pile (the loop) is mated with a fabric having barbs (the hook) to form a strong but readily reversible association between two surfaces.

The term "mate" as used herein with respect to hook and loop fabric pairs means to place a hook-bearing surface of a hook fabric against the pile-bearing surface of a loop fabric to form a reversible interlocking association between the two surfaces.

The term "adhesive-containing component" means a component such as a glue, putty, gum, resin, tar, cement, sealant, tape, adhesive strip or other component that can bond two surfaces together. The term particularly refers to components that have been or will be used to bond two surfaces together for purposes of the invention, to the extent to which this does not include an adhesive-backed hook and loop fabric pair.

The term "adhesive" refers to a substance that provides adhesion between two surfaces. The term "adhesive" is not limited by the molecular mechanism of adhesion, but includes simple glues, compound glues, natural adhesives, synthetic adhesives, adhesive compositions that cure by evaporation of a solvent, adhesive compositions that cure by a chemical reaction of one or more constituents, hot-melt adhesives, adhesive compositions comprising a substance for which the inherent tackiness is significant upon application and remains stable over time, and other categories of adhesives.

The term "attachment means" refers to a means for attaching a drape to a surface bound component. For purposes of illustration the description in this paragraph discusses means for attaching a drape to a vacuum cup but the invention is not limited to neither the use of vacuum cups, nor to the practical constraints for preserving a vacuum, nor to the shape or compositions found in vacuum cups. In certain embodiments the attachment means attaches an independent component to a vacuum cup other than within the vacuum zone. The term "attachment means" as contemplated herein includes screws (e.g., screwed into an eye located in the upper surface of a cup), bolts (e.g., bolted into an eye located in the upper surface of a cup), rivets (e.g., passing through a portion of a feature on the upper surface of a cup), dowels (e.g., having one end in a close-fitting orifice defined by the upper surface of a cup), hinges (e.g., wherein a hinge pin pierces at least one portion of a feature on the upper surface of a cup), clips (e.g., piercing or gripping a portion of a feature on the upper surface of a cup), rings (e.g., passing through a portion of a feature on the upper surface of a cup), hook (e.g., for hooking a drape to a vacuum cup or vice versa), clamps (e.g., gripping a portion of a feature on the upper surface of a cup), cotter pins (e.g., piercing and or gripping a feature on the upper surface of a cup), snaps (e.g., where one piece of a snap fit hardware is linked to the upper surface of a cup), and other means for attaching materials such as are used for drapes to hardware such as surface bound components. Attachment means may optionally be a glue, for instance during installation in a threaded- or smooth-bore orifice on the upper structure of a vacuum cup, thus a dowel or bolt or the drape itself may be treated with a powerful glue such as a polycyanoacrylate-based glue to enhance the strength of the connection. Attachment means may affix a handle by attachment to its lower surface in a way to one of these. For vacuum cups, attachment means optionally may include mushroom caps. For magnetically paired components, attachment means optionally may be enclosure in a sewn pocket of a drape, wherein the pocket is entirely sealed or wherein the pocket has an opening.

The term "linked" means the attachment of one component to another, regardless of whether the components are like or unlike. The term "linked" contemplates but is not limited linkage in a manner usual in the mechanical arts for the relative functions of the components being linked.

The term "drape" means a material that is capable of wrapping around one edge of a vehicle's window or window frame such that one end of the drape may be attached or otherwise associated with an interior surface of the window or its frame, and the other end of the drape may be attached or otherwise associated with an exterior surface of the same window. In some embodiments the drape is flexible, such as a natural fabric textile, plastic film, rubber sheet, woven thin wire metal screen, or other flexible format. In certain other embodiments the drape is stiff, such as a molded plastic, formed metal, shaped ceramic, carved wood, woven thick-wire metal screen, or other stiff drape. In particular embodiments the drape is sufficiently thin enough that the window edge or window frame edge around which the drape is wrapped may be closed tightly or closed nearly enough to create a windproof seal, thereby preventing drafts from entering the vehicle at or near those edges.

Illustration from the Figures

Important features of the invention may be understood by reference to caricatures of an illustrative embodiment of the invention as depicted in caricature by the drawings. This illustrative embodiment is not intended to be exclusive of other embodiments of the invention.

Figure 1:
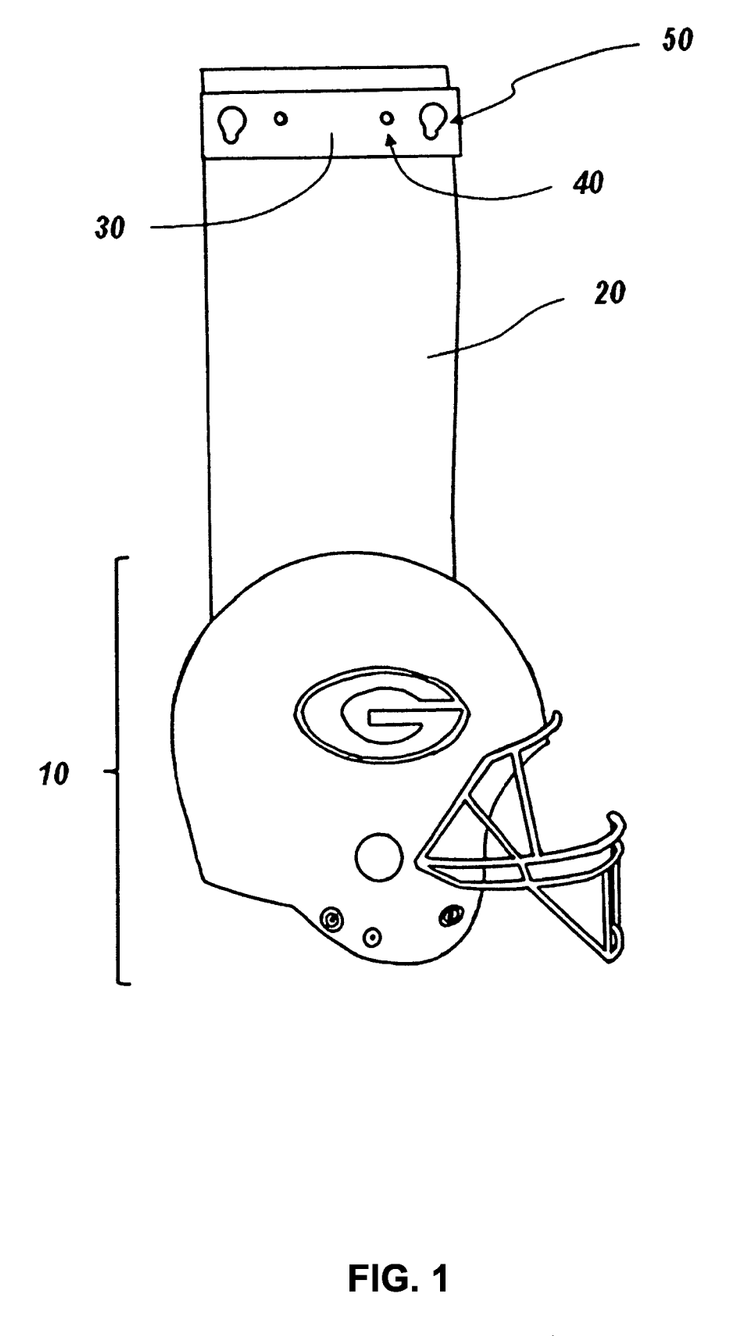
FIG. 1 is a caricature depicting a topside view of an illustrative embodiment of a device according to the invention.

Referring now to the topside caricature depicted in FIG. 1, the invention provides an affinity display (10) that is attached to a drape (20); the drape in turn is attached to other hardware by means of at least one bracket (30) in which are defined smaller orifices (40) for attachment by screws, bolts or rivets and in which are also defined larger orifices (50) for linking surface-binding components or their associated attachment means. The illustrative affinity display (10) shown is just one of many types of affinity displays that can be employed with the invention.

Figure 2:
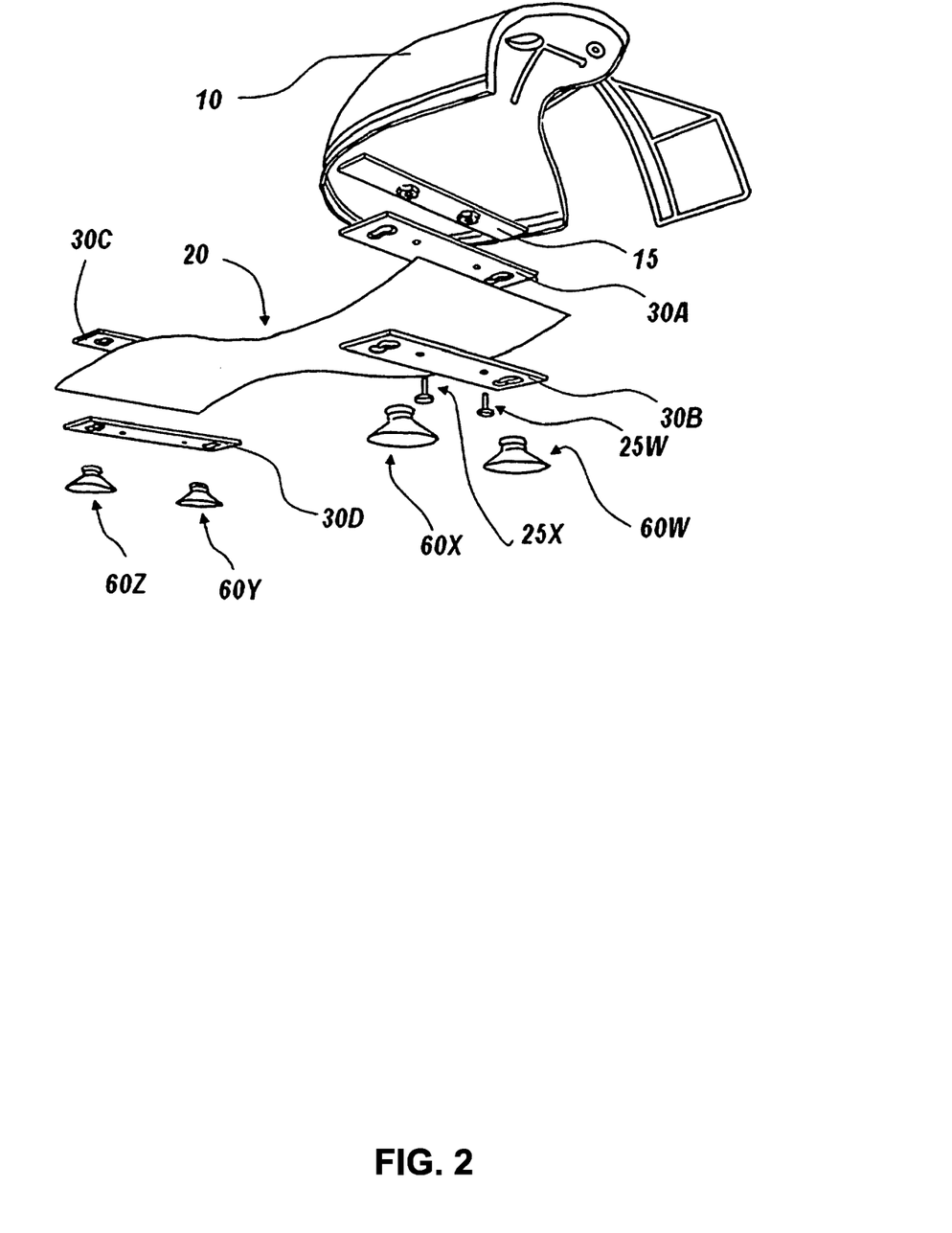
FIG. 2 is a caricature depicting an exploded underside view of an illustrative embodiment of a device according to the invention.

An exploded underside caricature depicted in FIG. 2 illustrates one of the ways in which an affinity display (10) may be attached to a drape (20) that is further linked to mechanical features for mounting the display on a vehicle window. In this embodiment the mechanical features 60W, 60X, 60Y, and 60Z are surface-binding components. Brackets 30A, 30B, 30C and 30D are affixed to the drape by means of fasteners such as screws, bolts, rivets, dowels, hinges, clips, rings, clamps, cotter pins, or other fasteners, as are the affinity display and the mechanical features 60 W-Z. A receiving bracket (15) optionally has nuts that are integral to the bracket or used in combination with it. The receiving bracket in this embodiment may be affixed to the back of a solid affinity display, or to a back plate of a hollow molded affinity display, or the receiving bracket may be attached to the sides of a hollow molded affinity display, or the receiving bracket may be a molded feature in the underside of an affinity display. Illustrative fasteners 25X and 25W may be screws, bolts or rivets but the invention is not so limited and other types of fasteners may be used. As shown here the fasteners may optionally pass through brackets that sandwich the drape, and may further affix the affinity display. Of course the drape will have an aperture wherever a fastener passes through the drape; for clarity's sake these apertures in the drape are not shown in the Figures. In a particular embodiment the fasteners may further pass through the mechanical features 60 W-Z to affix such features also. In an alternative embodiment the mechanical features 60 W-Z possess mushroom caps that are pushed through apertures in brackets 30 A-D, the drape, and the receiving bracket 15. In that alternative embodiment the locking function of such mushroom caps once pushed through apertures of appropriate sizes may render the use of other types of fasteners such as screws, bolts, rivets or other types unnecessary.

Figure 3:
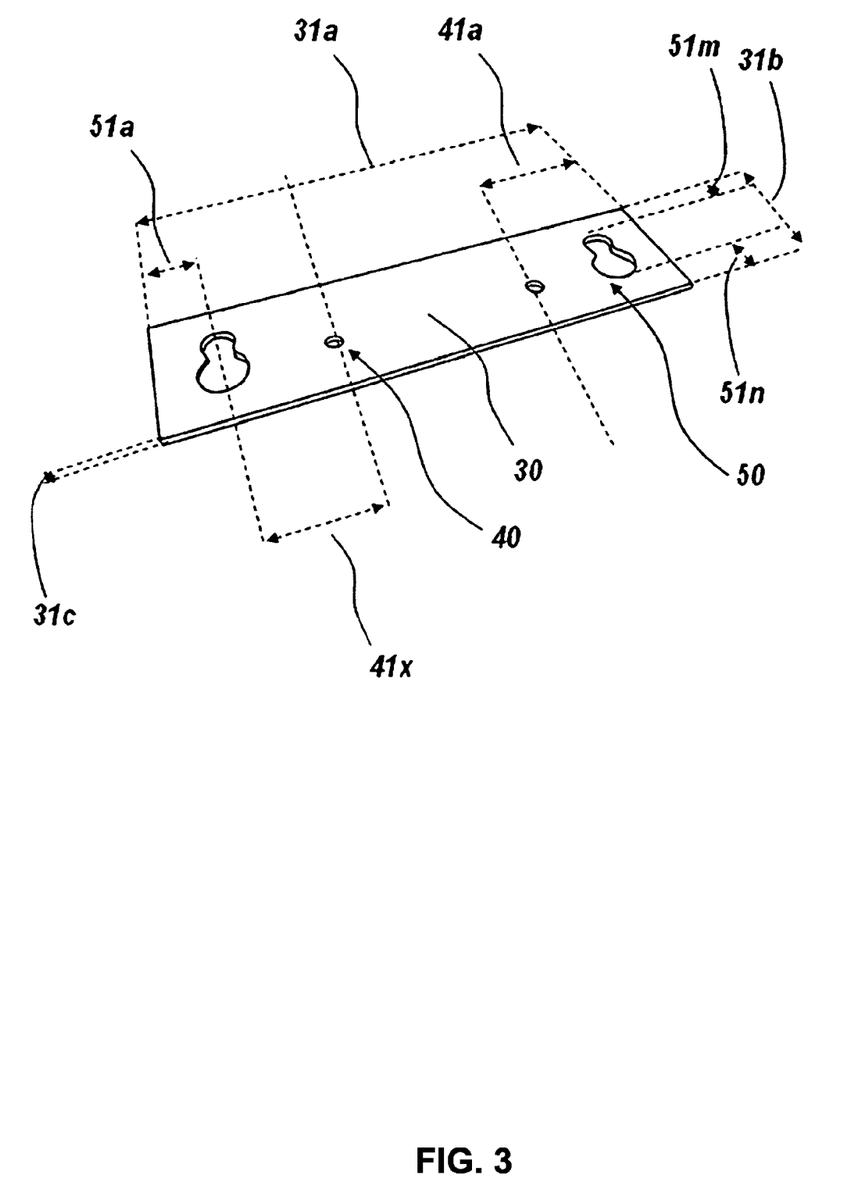
FIG. 3 is a caricature depicting a bracket for an illustrative embodiment of a device according to the invention.

FIG. 3 shows the design and dimensions for a bracket 30 that is useful for the construction of devices according to the invention. The bracket dimensions will depend on the width and fabric strength of the drape and on the dimensions of the affinity display. A useful set of dimensions for one embodiment of the invention is as follows. The bracket 30 is a metal plate—steel, aluminum or plastic can suffice. The plate's overall dimensions are 114.30 mm×29.85 mm×1.59 mm thick (dimensions $31a×31b×31c$, respectively). The circular apertures 40 each have a diameter of 4.00 mm; the center of each circular aperture is 34.96 mm from the nearest end of the bracket (dimension 41a) and 22.19 mm from the axis of symmetry for each keyhole-shaped aperture (dimension 41x). Each keyhole-shaped aperture (50) may be represented approximately as a larger circle (diameter 10.03 mm) juxtaposed to a smaller circle (diameter 6.73 mm), wherein the circle shapes are merged by coalescing them. The smaller circle is 7.03 mm away from the nearest long edge of the bracket (dimension 51m); the larger circle is 7.08 mm away from the other long edge of the bracket (dimension 51n); and their common axis of symmetry is 12.77 mm away from the nearest end of the bracket (dimension 51a). These dimensions are provided merely for illustrative purposes; the invention is not limited to any of these sets of dimensions.

Components

A. Drapes

The dimensions and robustness of the drape are important. For uses in which deterrence to thieves or vandals is desired, the drape should be constructed of a sufficiently strong material that it cannot be torn easily by a passerby. Illustrative, non-limiting examples of sufficiently strong materials are heavy canvas fabric, heavy denim fabric, heavy so-called rip-stop nylon fabric, tin sheets, and polyethylene and polyterephthalate compositions having at least the same thickness as the wall of a milk jug or soda bottle. In addition, unless the user desires to allow shredding of the drape for decorative reasons, the drape should resist shredding under use conditions. For external displays on building windows this means the drape has shred-resistance at ambient wind speeds, whereas for vehicles this means resistance of shredding under wind conditions at highway speeds. Metallic and polymeric compositions are particularly robust under high wind conditions but heavy fabrics may also suffice. In certain embodiments particularly preferred drapes are thin and flexible but the invention is not so limited. Where a drape will be exposed to the weather for long period the drape material may be selected to resist fading in the sun, resist mildew formation in damp conditions, or to be easily cleaned by wiping down, but the invention is not so limited.

The appearance of the drape may be selected based on aesthetic criteria provided that they permit the drape to possess and retain the desired amount of strength and robustness. Thus the drape may have a two-dimensional shape that is circular, semi-circular, oval, square, rectangular, ribbon-shaped, triangular, another geometric shape, star-shaped, crescent-shaped, cross-shaped, shield-shaped, snowflake-shaped, face-shaped, vehicle-shaped, animal-shaped, human figure-shaped, number-shaped, building-shaped, helmet-shaped, or have any other desired shape. The drape may have any color, hue, reflectance or degree of transparency desired, or any combination thereof, and may bear printed, woven, dyed, painted, drawn, embossed, laminated or embroidered designs or may bear designs provided by other means. Optionally the drape may be hemmed, pleated, ruffled, quilted, pocketed, lined, textured, pinned, sequined, button-holed or otherwise slit or perforated, braided, ornately woven as for example is lace, decoratively folded as for example in origami, or may otherwise be made decorative by physical alteration by means known in the arts of film handling, textile preparation, sewing and other fabric work. The drape may be employed with a single window, or may for instance be sufficiently large to be serve each of a plurality of windows, optionally with surface-binding components on either or both major surfaces of each respective window.

The length of the drape is selected such that the externally exhibited affinity display may be as far as desired from the edge of a vehicle's window, whether this is below the top edge, or forward or back from the side edge, of that window. In some embodiments of the invention the working length of the drape is adjustable by the user. For instance, more of the drape may be kept inside a vehicle or building, or hardware for attaching surface-binding components to the drape may be shifted, for instance to shorten the length of drape that is located between surface-binding components for the two major surfaces of the window. In certain embodiments the drape's length (i.e., along the dimension that wraps around a window) is in the range of 6 inches to 6 feet; in others it is in the range of 1 to 4 feet; in others it is in the range of 2 to 3 feet; in yet others it is in the range of about 6 to 36 inches. In certain embodiments the drape's width (i.e., along the dimension that is orthogonal to the wrap direction around a window) is in the range of 6 inches to 6 feet; in others it is in the range of 1 to 4 feet; in others it is in the range of 2 to 3 feet; in yet others it is in the range of about 6 to 36 inches.

Where desired, apertures may be created in the drape for penetration by fasteners, and such apertures may have their edges reinforced by stitching, metal grommets, molded plastic borders, or other reinforcement.

Where sealing of windows is of particular concern, the drape optionally may have an appended gasket or insulating strip located above and or below it where the drape rides a window edge, such that the drape provides an air tight seal when the window is closed or when it is mostly closed.

Optionally the drape comprises an adhesive backing on a substantial proportion or all of its area that will be juxtaposed with a major surface of a window.

B. Surface-binding Components

1. Vacuum Cups

A vacuum cup, sometimes known as a suction cup or sucker, uses negative fluid pressure of air or water to adhere to surfaces; vacuum cups adhere especially well to nonporous surfaces. Generally the working face (defined herein as the vacuum zone) of the vacuum cup has a curved surface. When the center of the suction cup is pressed against a relatively flat smooth surface, the volume of the space between the suction cup and the flat surface is reduced, which causes the air or fluid between the cup and the surface to be expelled past the rim of the cup. When the user ceases to apply pressure, the cup's elastic composition tends to resume its original shape. Because all of the air or fluid has already been forced out of the inside of the cup, the cavity developed between the cup and the flat surface has little to no air or water in it, and thus lacks pressure. The difference between atmospheric pressure on the outside and the low-pressure cavity on the inside of the cup sustains the adhesion. The duration of the effect is a function of how effectively leaks from the outside atmosphere are controlled.

The vacuum cup may be comprised of any suitable flexible material and are widely available. For instance, suitable vacuum cups are sold by SAS Automation (see http://www.sasgripper.com/product_sections/section_vacuum_cups.htm). Particularly suitable materials for the vacuum cup include chloroprene, polyurethane, nitrile rubber, silicone rubber, and viton. Chloroprene has good wear resistance, and is useful in the temperature ranges −40° to 230° F. (−40° to 110° C.). Polyurethane has excellent wear resistance, a very long life, is oil resistant, and is useful in the temperature ranges −58° to 248° F. (−50° to 120° C.). Softer polyurethanes may be used but are best on textured surfaces whereas a windshield is smooth Nitrile rubber has good wear resistance properties, is oil resistant, and is useful in the temperature ranges −20° to 225° F. (−50° to 120° C.). Silicone rubber is a soft material, is especially good for rough and textured surfaces, and is useful in the temperature ranges −86° to 392° F. (−65° to 200° C.). Note that windshields are exposed to both the hottest summer conditions and coldest winter conditions, thus the extremes of temperature noted here are relevant to choice of material.

The design of the vacuum cup may be of any type known in the art that is suitable for sustaining suction. Suitable suction cup designs include but are not limited to a flange type, a bellows cup type, a snap on or bolt type, and a push on or clamp type.

The force of a vacuum cup when in use follows the relationship F=AP, where F=force, A=area, and P=pressure. For example, for a cup of radius 2.0 cm and area $\pi(0.020 \text{ m})^2$=ca. 0.0013 square meters, the result is F=(0.0013 m$^2$)(100,000 Pa)=ca. 130 Newtons, assuming the pressure inside the cup is negligible when compared to atmospheric pressure. However the calculation requires more finesse. The specifications for sizing vacuum cups additionally focus upon lift capacity and the margin of safety. Suitable lift capacity at sea level is determined by the following theoretical relationship; actual lift capacities should be determined empirically.

$$C = \frac{0.393 \times D^2 \times V}{N}$$

C=Lifting Capacity (lbs.)
D=Cup Diameter (in.)
V=Vacuum Level (in Hg)
N=Desired Safety Factor (≥2 for horizontal lifting; ≥4 for vertical lifting)

$$D = 1.61 \times [(M \times N)/(V \times U)]^{1/2}$$

D=Diameter of vacuum cup (in.)
M=Mass of lifting product (lbs. of force to be applied)
V=Vacuum Level (in mm Hg)

N=Safety Factor (≥2 for horizontal lifting; ≥4 for vertical lifting)

U=Number of Cups

For the present invention a pair of circular vacuum cups having overall respective outer diameters of 1.06 inches have been found to be more than sufficient to adhere and support a 1.5 kg solid silicone affinity display on a vehicle's retractable side window even without a drape. Affinity displays may weigh substantially less than 1.5 kg—even as low as 150 g. The drape is still considered useful as a safeguard in the event that a vacuum cup loses its seal.

Whether a vacuum cup is used singly or in combination, a manually-attainable lifting capacity C is desirable (e.g., in the range of 1-50 lbs., or alternatively 3-40 lbs, or alternatively 5-30 lbs., or alternatively 7-20 lbs., or alternatively 9-15 lbs, or alternatively about 10 lbs.). The lifting capacity can be higher for instance if the cup is fitted with a stopcock to allow air in when desired or is equipped with an optionally removable lever that permits greater force to be applied on one side to break a static vacuum seal and disengage the cup. A safety factor N of 1 or 2 is particularly useful but alternatively N may be 3 or 4. For purposes of the calculation, the lifted mass M may be the same as C. Either a single vacuum cup (i.e., U=1) or a plurality of smaller vacuum cups may be used to obtain a comparable result.

In particular embodiments the suction of the applied vacuum cup may be enhanced by the use of a peripheral vacuum source such as a manually powered pump or electrically powered pump.

In certain embodiments vacuum cups are employed that are connected to a handle either directly or by an attachment means. The handle may be used to apply pressure to the vacuum cup to create suction during attachment to a window or to facilitate removal of the vacuum cup once it is applied to the window surface. The handle optionally may be designed to be pushed, pulled or turned to accomplish these tasks.

For vacuum cups, optionally the attachment means is a mushroom cap, such as for insertion into the orifice of a bracket.

2. Magnetically Paired Components

Retaining a drape on a window major surface by means of a magnet depends on the pull force of the magnet's field, which here is the force operating across the window to the opposite member of magnetically paired components. Note that although one magnetic rule of thumb states that shear force will support approximately one third of the stated pull force value, two surfaces that have low friction allow gliding over one another, thus the smooth surface of a magnet is often free to slide along a smooth window surface.

The pull force is often defined as the force required to pull a magnet free from a flat steel plate when the force is perpendicular to the surface. This is a vector measurement, as opposed to the scalar measurement of net magnetism. The pull force is usually measured empirically: theoretical values are notoriously unreliable because magnetic strength is affected by electricity, heat, humidity in some cases, and by rusting of the iron at the surface. For this reason magnets are often nickel-clad or have a plastic coating glued to their exterior. Because the ratings are determined empirically the strength of commercial magnets is generally provided on labels in terms of their gauss ratings. Even those commercial ratings have caveats because they are often stated in terms of the magnetic strength at the core of the magnetic solid, whereas the magnetism at the surface is generally substantially less, and the magnetic force that exists outside the magnetic solid falls exponentially with the linear distance from the surface. Moreover values stated in terms of surface magnetism concern values at the center of the axis of the magnet; values from off-center points may vary.

These considerations lead to pragmatic specifications for the magnet. For the present invention the pull forces of most interest are those that are experienced from the other side of a window plate. In some embodiments of the present invention a magnet's pull strength is chosen such that the attractive force experienced by the countermember of a magnetically pairable pair of components across a window is in the range of 1-50 lbs., or alternatively 3-40 lbs, or alternatively 5-30 lbs., or alternatively 7-20 lbs., or alternatively 9-15 lbs, or alternatively about 10 lbs. Where magnetic strengths are too low they can be enhanced by stacking of magnetic components. Suitable magnets are sold for example by K&J Magnetics, Inc., as shown with their part numbers, sizes and respective pull forces in catalog listings posted at http://www.kjmagnetics.com/magnetsummary.asp. A non-limiting illustrative group of K&J magnets are disc-shaped mounting magnets such as MM-C-10 (0.394", 4.90 lb. pull force), MM-B-16 (0.63" dia., 8.80 lb. pull force), MM-A-16 (0.63" dia., 11.00 lb. pull force), MM-C-16 (0.63" dia., 12.10 lb. pull force), MM-A-25 (0.984" dia., 31.00 lb. pull force), MM-A-32 (1.26" dia., 55.10 lb. pull force), etc. Where particularly strong magnetic attraction is desired, as for an affinity display for permanent mounting, a stronger magnet can be used such as a MM-C-36 (1.471" dia., 90.40 lb. pull force) or even a MM-A-75 (2.953", 357 lb. pull force). However the invention is not limited by the size, manufacturer or form of the magnets that are used.

Magnetically paired components optionally may be attached to the drape by enclosure in a sewn pocket.

3. Hook and Loop Fabric Pairs

Hook and loop fabric pairs, also known as Velcro® or hook and pile fabrics, provide adhesive strength that is biased in particular directions. Numerous variations on the materials designs now exist, thus their relative pull forces are quite variable. Some reported measurements for typical pairs found 6.5 psi of tension force (i.e., perpendicular pull off force, in pounds per square inch), shear force along the length of fabric strip pairs at 10.0 and 14.0 psi, shear force across the width of fabric strip pairs at 6.5 and 10.5 psi, and peel force along the length at 0.6 and 1.2 pounds per inch of width. Examples of commercially available hook and loop fabric pairs can be found at http://www.hookandloop.com/site/product_definitions.cfm, however the invention is not limited by either the hook and loop variants or by the choice of manufacturer.

Hook and loop fabric pairs made from spring steel (i.e., Metaklett®) have been reported to have substantially higher native pull forces—exceeding the equivalent of 10 psi—with the further advantage of being relatively unaffected by high temperatures and chemical effects. The metal version could offer significant advantages for use on vehicles that are regularly exposed to hot climates and or spatters containing road oil or other fluids. Steel and cloth Metaklett® hybrids have also been made.

Certain factors affect hook and loop pull strengths. The forces can be higher when the hook and loop fabric is located on a vibrating surface because the shaking causes a higher proportion of hooks to engage with loops. The forces are also higher when the fabric is located on a stiff surface such as a vehicle panel or window, because pulling forces are then distributed more uniformly across the fabric. Hook and loop fabric pairs are commercially available in which the fabric is of a rigid construction. The pull force of the connection can also be increased or decreased proportionally as a linear function of the number of square inches of hook and loop interface. In addition, in many cases treating one or both hook and loop surfaces with a lubricant such as a silicone can decrease the pull force several fold.

The pull forces for separating hook and loop fabric pairs are of course only relevant if even greater force is required to remove the fabric from an underlying surface. Thus glues that bond strongly to surfaces are commonly used to attach hook and loop fabric pairs to rigid substrates. An illustrative adhesive of a suitable glue is poly(cyanoacrylate) (Super Glue®), but the invention it is not so limited. Among the typical adhesives for hook and loop fabric pairs are pressure-sensitive adhesives and adhesives that are activated by an applied factor such as by the application of solvent, heat, ultrasound or a dielectric field. A guide to suitable adhesives is available at http://troyerproducts.com/faqs.asp?display=pdf&type=item&id=604860626353, and its contents are incorporated herein by reference. Hook and loop fabric pairs with adhesive backings are commercially available for instance at http://www.velcro.com and its linked web pages, and include offerings in which the adhesive side of the fabric can be readily and cleanly removed without damage to the surface on which it has been bonded.

Similar considerations of robustness apply to hook and loop fabric pairs in which one member of the pair is sewn onto a drape. Thus in preferred embodiments the sewing employs a sufficient combination of thread strength and stitch multiplicity to enable the pair member to remain attached to the drape when the hooks are separated from their mated loops by tugging on the drape. When desired, stronger attachments may be provided by the use of rivets or other attachment means.

The pull force for the mated hooks and loops may be any that the user finds desirable. In certain embodiments of the present invention the area and pull strength of each mated hook and loop fabric pair is chosen such that the pull force under typical conditions is in the range of 1-50 lbs., or alternatively 3-40 lbs, or alternatively 5-30 lbs., or alternatively 7-20 lbs., or alternatively 9-15 lbs, or alternatively about 10 lbs. In an illustrative embodiment where the pull force is 6.5 psi, those values correspond respectively to ranges of about 0.15 to 7.7 square inches, 0.46 to 6.2 square inches, 0.75 to 4.6 square inches, 1.1 to 3.1 square inches, 1.4 to 2.3 square inches, and about 1.5 square inches. However the invention is not limited by the pull force per square inch or the average area of each mated hook and loop fabric pair.

4. Adhesive-containing Components

For long-term uses and also for uses that are amenable to use of readily removable adhesives, adhesive-containing components are particularly useful. For long-term uses the selected pull forces optionally may be stronger than those that would be selected for the vacuum cups, magnetically pairable components and hook and loop fabric pairs. This is so simply because regular removal will not be necessary. In many other cases however it will be convenient to have the same range of pull forces as for the other types of surface-binding components.

Adhesives are useful for joining thin or dissimilar materials, minimizing weight, and when a vibration dampening joint is needed. A disadvantage to adhesives is that if the adhesive needs time to cure (as opposed to an adhesive that is initially very tacky and remains so over time) they do not form an instantaneous joint. Also, the quality of adhesive bonds is often dependent in part on how uniformly the adhesive-containing component is applied, because failure of the bond tends to occur where an adhesive composition is absent or thinnest.

In certain embodiments of the present invention, the adhesive-containing component is applied in such a way that under typical conditions the pull force for separating a pair of surfaces bonded by the surface-binding component is in the range of 1-50 lbs., or alternatively 3-40 lbs, or alternatively 5-30 lbs., or alternatively 7-20 lbs., or alternatively 9-15 lbs, or alternatively about 10 lbs. The necessary force may be determined by means that are well known in the art, such as by double cantilever beam (DCB) tests, tapered double cantilever beam (TDCB) tests, peel tests, wedge tests, mixed-mode delaminating beam (MMDB) tests, end notch flexure tests, crack lap shear tests (CLS), or other tests that are known in the art of adhesion science.

5. Combinations of Component Types

Two or more types of surface-binding components optionally may be combined for use with a single drape, and every permutation of such combinations is contemplated by the invention. Thus for example in certain embodiments one or more vacuum cups may be used on the internal major surface of a window and one or more adhesive-containing components may be used on the window's external major service, or vice versa. In certain other embodiments two magnetically paired components may be used to provide a powerful attraction across a window that can be removed in a facile way by sliding them off, where the magnetic pair is used in combination with at least one hook and loop fabric pair to provide resistance in the shear direction thereby limiting sliding movement of the drape when it is desired to remain in place. Many other such combinations of surface-binding components for use with the invention will occur to those of ordinary skill in the art, and these are contemplated by the invention.

C. Affinity Displays

The affinity displays may be comprised of any suitable composition. For purposes of economy, durability and attractiveness, in one embodiment particularly useful materials are moldable or extrudable compositions having at least one durable printable surface, such as compositions that are thermoplastic polymers, thermoset polymers (e.g., if cured in molds), formable metals, formed paper pulp and the like. Illustrative compositions for such materials include polyethylene, polypropylene, polyethylene terephthalate, silicone rubbers, polyisoprene, nylon, polystyrene, epoxies, aluminum, tin, and papier-mâché, but the invention is not so limited. Where wind resistance and wind-blown grit on roads are expected, materials with high hardness may be selected in order to forestall pitting and provide a longer life for the display.

The weight and size of the affinity display will vary with the choice of size, design and composition, but in many cases they need not be heavy. As an example, an affinity display prototype that was prepared by the inventors for vehicle windows was comprised of a silicone rubber solid body (as opposed to a hollow shell) having an average diameter approaching twelve inches and a thickness of about one inch, and weighed about 3.3 lbs. (1.5 kg). This was rather heavy and was a softer material than might be desired for many applications, but nevertheless was very serviceable even with these properties.

D. Attachment

An illustrative but non-exclusive list of suitable attachment means includes screws, bolts, rivets, dowels, hinges, clips, rings, clamps, cotter pins, snaps, adhesives and other means for attaching hardware to the type of material used for the drapes. For particularly facile routine removal of hardware, spring clips, ratcheting triggers, quick-connects, and the like may be used. The choice of material from which the attachment means are comprised is limited only by the strength and flexibility required for their use, thus in non-limiting illustrative embodiments their composition may be metallic, polymeric, ceramic, a natural material such as wood or any combination thereof.

The attachment means for one or both members of two magnetically pairable components optionally may be enclosure in a respective pocket of a drape. Such pockets may have an opening or be fully enclosed.

E. Other Modifications

Any of the components of this invention may be further modified to enhance the communication of affinity. For instance the drape, a vacuum cup, a magnetically pairable component, a hook, or another component may have an additional device appended. In one embodiment the additional device is one or more LED or other lights such as in a decorative pattern, a spelled message, a nonverbal symbol, a blinking pattern or another light display. In some embodiments the additional device is designed to make a sound. An illustrative, non-limiting example of such sound-making devices is a whistle that blows one or more notes when wind passes through it at traffic speeds. Another illustrative, non-limiting example of such sound-making devices is a device that operated under battery or other power to provide a meaningful sound on demand such as animal noises, oral words, music, sleigh bells, crowd noises, the sound of fireworks, or other sounds.

Variations

Although specific embodiments of the present invention have been described above in detail, the description is merely for purposes of illustration. In addition to the embodiments above various modifications of, and equivalent elements corresponding to, the disclosed aspects of the exemplary embodiments, can be made by those of ordinary skill in the art without departing from the spirit and scope of the present invention defined in the following claims, the scope of which is to be accorded the broadest interpretation so as to encompass such modifications and equivalent structures.

We claim:

1. A mounting system for window affinity displays for use on a vehicle window, the mounting system for window affinity displays comprising:
    a drape that nondestructively fastens to the vehicle window, the drape having first and second opposite ends, the drape being coupled to at least a first surface binding component proximate to the first end of the drape, the drape having a width dimension that is less than six inches and less than half of a lateral length between the first and second ends; and
    an affinity display that is three dimensional and coupled to the second end of the drape, such that the affinity display is distal from the first end and opposes the first surface binding component during attachment,
    wherein one of the second end of the drape and the affinity display includes a second surface binding component that opposes the first binding component when the drape is positioned for affixing, such that the first and second surface binding components affix onto interior and exterior sides of the vehicle window respectively, thereby positioning the affinity display on the exterior side of the window.

2. The mounting system of claim 1 wherein the surface-binding components are selected from the group consisting of vacuum cups, magnetically pairable components, hook and loop fabric pairs, and adhesive-containing components.

3. The mounting system of claim 1 wherein the mounting system has at least a third surface-binding component coupled to the affinity display.

4. The mounting system of claim 1, wherein the first surface binding component is coupled to the drape via a screw, bolt, rivet, dowel, hinge, clip, ring, hook, clamp, cotter pin, snap, adhesive, spring clip, ratcheting trigger, quick-connect, pocket or mushroom cap.

5. The mounting system of claim 1 wherein the drape comprises at least one of a natural fabric textile, a synthetic fabric textile, a plastic film, a rubber sheet, a woven polyolefin, a thin wire metal screen, a molded plastic, a formed metal, a shaped ceramic, a carved wooden item, and a woven thick-wire metal screen.

6. The mounting system of claim 1 wherein the drape is less than 0.25 inches thick and less than 3 inches wide at a portion that wraps around the vehicle window edge or a vehicle window frame edge.

7. The mounting system of claim 1 wherein the length the drape is within the range of about 6 inches to about 36 inches, and the width of the drape is less than 3 inches.

8. The mounting system of claim 1 wherein the drape is pocketed.

9. The mounting system of claim 1 wherein the drape's appearance is opaque.

10. The mounting system of claim 1 wherein the drape is conditioned to provide an air tight seal along the portion of the drape that in contact with the top of the window when the window is closed.

11. The mounting system of claim 1 wherein the drape wraps around one edge of one of a vehicle retractable sunroof, a vehicle hinged sunroof, a vehicle retractable side window, a vehicle hinged side window, a vehicle retractable rear window, and a vehicle hinged rear window.

12. The mounting system of claim 1 wherein the affinity display includes at least an inside surface that affixes to the exterior major surface of the vehicle window via the second surface binding component.

13. The mounting system of claim 1 wherein the affinity display provides a symbol for a sports team, academic institution, competitive event, religious or secular holiday, professional or political association, hobby, charity, or political cause.

14. The mounting system of claim 1 wherein removal of a surface-binding component from a major window surface on which it has been placed would require a pull force of between 5 and 30 lbs.

15. The mounting system of claim 1 wherein the affinity display is a light-up or sound-producing device.

16. A mounting system for window affinity displays for use on a vehicle window, comprising:
    a plurality of vacuum cups, each comprising a respective vacuum zone;
    a drape having a first end and second end, the first and second ends laterally opposite from one another and spanning a lateral length twice as long as a width of the drape, wherein a first vacuum cup is coupled to the drape proximate to the first end; and
    an affinity display that is coupled to the drape proximate to the second end and is distal relative to the first end, wherein the affinity display is further coupled to at least a second a vacuum cup, wherein the affinity display is a three-dimensional object, wherein the affinity display opposes the first vacuum cup during attachment,
    wherein the first and second vacuum cups oppose one another during attachment on opposite major sides of the vehicle window such that a first end of the drape is on an opposite side of the window from the second end of the drape and the affinity display.

17. The mounting system of claim 16 wherein one or more of the vacuum cups is comprised of chloroprene, polyurethane, nitrile rubber, silicone rubber, or viton.

18. The mounting system of claim 16 wherein one or more of the vacuum cups is of a flange type, a bellows cup type, a snap on or bolt type, or a push on or clamp type.

19. The mounting system of claim 16 wherein one or more of the vacuum cups includes or is coupled to a mushroom cap for locking into a collar by push-through mode.

20. A mounting system for window affinity displays for use on a vehicle window, the mounting system comprising:
- a drape having a first end and an opposite second end spanning a longest length of the drape and a width of less than six inches, the drape coupled proximate to the first end to a first attaching member that fastens to an interior surface of the vehicle window;
- an affinity display that is coupled to the drape proximate to the second end and is distal relative to the first end, wherein the affinity display comprises a three-dimensional object that opposes the first attaching member during attachment,
- wherein the affinity display is coupled to a second attaching member, wherein the first attaching member opposes the second attaching member to secure the affinity display to an exterior surface of the vehicle window.

21. The mounting system of claim 20, wherein the second attaching member is coupled to the affinity display and not the drape.

22. The mounting system of claim 20, wherein the first and second attaching members include are selecting from a group comprising suction cups, magnets, hook and loop fabric pairs, and adhesives.

23. The mounting system of claim 20 wherein the drape has an adhesive backing on at least half of its surface area that will be juxtaposed with the exterior surface of a window.

24. A display apparatus for displaying on a vehicle window that includes inside and outside major surfaces relative to the vehicle, the display apparatus comprising:
- an affinity object that attaches outside the vehicle window, wherein the affinity object is three-dimensional; and
- a flexible mounting member having opposite first and second ends, a longest dimension between the first and second ends, and a width that is less than six inches, and a thickness of less than one centimeter,
  - wherein the flexible mounting member is coupled to the affinity object proximate to the second end, and is further coupled to a first suction cup proximate to the first end,
  - wherein the first end is distal in relation to the affinity object and the first suction cup opposes the affinity object during attachment, the affinity object attaching outside the vehicle window; and
- a second suction cup is coupled to at least one of (i) a location proximal to the second end of the flexible mounting member and (ii) the affinity object, such that the second suction cup opposes the first suction cup during attachment.

25. The display apparatus of claim 24, wherein the affinity object is configured to be secured to the window without also having to secure the flexible mounting member to the window.

26. The display apparatus of claim 24, wherein the flexible mounting member is removably coupled to the affinity display device such that the affinity display is adhered to the window without the flexible mounting member.

27. The display apparatus of claim 24, wherein the affinity display device is a replica of sports equipment.

28. The display apparatus of claim 24, wherein the affinity display is a portion of a sports helmet.

* * * * *